(12) United States Patent
Chapman

(10) Patent No.: US 10,425,554 B1
(45) Date of Patent: Sep. 24, 2019

(54) METHOD FOR GENERATING AND PRINTING A DRIFT RESISTANT PANTOGRAPH MARK

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/142,050

(22) Filed: Sep. 26, 2018

(51) Int. Cl.
*H04N 1/32* (2006.01)
*H04N 1/00* (2006.01)

(52) U.S. Cl.
CPC ....... *H04N 1/32229* (2013.01); *H04N 1/0087* (2013.01); *H04N 1/00883* (2013.01); *H04N 1/32352* (2013.01)

(58) Field of Classification Search
CPC .......................... H04N 1/00838–00883; H04N 1/32101–32352; G06F 3/1222; G06F 3/1238; G06K 15/4095; G06T 1/0021–0092; B41M 3/10; B41M 3/14; B41M 3/148; G07D 7/00; G07D 7/003; G07D 7/0034; G07D 7/005; G07D 7/0053; G07D 7/0054; G07D 7/0055
See application file for complete search history.

(56) References Cited

U.S. PATENT DOCUMENTS

| | | | | |
|---|---|---|---|---|
| 7,845,572 B2 * | 12/2010 | Wicker | ................. | B42D 25/29 235/462.04 |
| 7,869,090 B2 * | 1/2011 | Wang | ................. | H04N 1/00864 358/1.11 |
| 7,894,103 B2 | 2/2011 | Wang et al. | | |
| 7,999,973 B2 * | 8/2011 | Nakata | ............... | H04N 1/00867 283/113 |
| 8,049,933 B2 * | 11/2011 | Murakami | ......... | H04N 1/00838 358/3.23 |
| 8,233,197 B2 | 7/2012 | Wang et al. | | |
| 8,335,014 B2 * | 12/2012 | Muramatsu | .......... | H04N 1/6033 358/1.13 |
| 8,909,775 B2 | 12/2014 | Tredoux et al. | | |

(Continued)

OTHER PUBLICATIONS

Aronoff J.S. et al., Automated Optimization of Void Pantograph Settings, Oct. 6, 2011 Hewlett-Packard Development Company, L.P.

*Primary Examiner* — Scott A Rogers
(74) *Attorney, Agent, or Firm* — Fox Rothschild LLP

(57) ABSTRACT

To generate a security mark, a system prints test pattern marks of varying frequencies on a first substrate. The system copies the test pattern marks onto a second substrate. The system analyzes the copy to identify a frequency or period range for test patterns that exhibit a high level of contrast as compared to the original. It then uses the identified range to generate an array of cells having pantograph marks of various foreground/background frequencies/periods. The system prints the array and generates polygons that contain cells in which the foreground is visually distinguished from the background. The system identifies the polygon having an inner point having a largest range to edge. It identifies the frequency/period of the background pattern and of the foreground pattern of the cell that contains the inner point. It then generates a pantograph mark having a background and foreground that correspond the identified frequencies or periods.

20 Claims, 7 Drawing Sheets

(56) References Cited

U.S. PATENT DOCUMENTS

| | | |
|---|---|---|
| 10,009,503 B1 | 6/2018 | Chapman |
| 10,237,442 B2 * | 3/2019 | Chapman ............ H04N 1/32331 |
| 2016/0127603 A1 | 5/2016 | Chapman et al. |

* cited by examiner

FIG. 5

METHOD FOR GENERATING AND PRINTING A DRIFT RESISTANT PANTOGRAPH MARK

BACKGROUND

Security is an important requirement in many printing applications. In situations such as official or government document printing, event ticket printing, financial instrument printing and the like, many printed materials must be protected against copying, forging and/or counterfeiting.

In some situations, document creators may wish to encode a security mark in a document in a way that is invisible to the human eye, but which becomes visible when the document is copied. For example, financial instruments such as checks, event admission tickets and other documents for which it is important to visually distinguish the original from a copy may include such security marks. An example of such a mark is a pantograph mark. The features of pantograph marks will be described below, but by way of example it is common to print a "void" pantograph mark on a document so that certain content of the security mark is not visible to the unaided human eye on the original, but the content will be visible on a copy of the original. An example of this is shown in FIG. 1, in which an original document 11, such as a bank check, has a security mark printed on it. The security mark includes the word "VOID", but this word is not visible to the human eye in the original document 11. However, when a color copy 12 of the original document is printed, the word "VOID" is visible to the unaided human eye in the color copy 12.

The process of creating a pantograph mark that is suitable for a particular application can be a labor intensive process. Typically, several test marks are printed on test swatches using various patterns. The swatches are visually assessed, and the swatch that is determined to be best is used. The determination of "best" can be subjective, as it can consider how well the mark is hidden in the original and/or how prominent the mark appears in the copy. In addition, this process is time consuming, as it is common to print dozens, and in some cases hundreds, of test patterns to guide the process of selecting a pattern that is subjectively determined to be best.

This document describes methods and systems for creating a pantograph mark that addresses at least some of the problems described above, and/or other problems.

SUMMARY

In various embodiments, a system of one or more print devices generates a document bearing a security mark. A print device of the system prints a first document that comprises test pattern marks on a first substrate. Each of the test pattern marks exhibits a pattern having a frequency, and the frequencies vary among the test pattern marks. A print device also prints a second document onto a second substrate. The second document is a copy of the first document. The system analyzes test pattern marks that appear on the second substrate to determine a first frequency range. The system selects a second frequency range that is at least one half of the first frequency range. The system generates an array of cells in which each of the cells comprises a foreground that exhibits a frequency that is within either the first frequency range or the second frequency range, and a background that exhibits a frequency that is within the other of the first frequency range or the second frequency range. The array includes cells that exhibit a plurality of combinations of frequencies of the first frequency range and the second frequency range. A print device of the system prints a third document onto a third substrate. The third document comprises the array of cells. A print device of the system prints a fourth document onto a fourth substrate. The fourth document comprises a copy of the third document. The system generates one or more polygons, each of which comprises a border of an area that surrounds a plurality of adjacent cells in which the foreground is able to be visually distinguished from the background. The system selects, from the one or more polygons, the polygon having an inner point having a largest range from the inner to an edge of the polygon. The system identifies the frequency of the background pattern and the frequency of the foreground pattern of the cell in which the inner point appears. The system generates a pantograph mark having a background and foreground that correspond to the identified frequencies.

A print device also may print the pantograph mark onto a fifth substrate.

In various embodiments, when the system analyzes the test pattern marks to determine the frequency range of interest, it may identify one or more of the test pattern marks printed on the second substrate that exhibit a highest level of contrast with respect to corresponding test pattern marks printed on the first substrate. Optionally, when identifying one or more of the test pattern marks printed on the second substrate that exhibit the highest level of contrast with respect to corresponding test pattern marks printed on the first substrate, the system may process an image of the first substrate and an image of the second substrate to identify the one or more test pattern marks that exhibit the highest level of contrast.

In some embodiments, the first frequency range and the second frequency range each have corresponding upper and lower limits, and selecting the second frequency range comprises selecting the second frequency range to be a range having: (a) an upper limit that is at least one half of the upper limit of the first frequency range; and (b) a lower limit that is at least one half of the lower limit of the first frequency range.

In some embodiments, the array has an x-axis and a y axis. The x-axis comprises frequencies of one of the first frequency range or the second frequency range, and the y-axis comprises frequencies of the other of the first frequency range and the second frequency range.

In some embodiments, when selecting, from the one or more polygons, the polygon having an inner point having a largest range from the inner point to edge the system may, for each of the one or more polygons, identify a cell having the largest number of potential rectangles between that cell and a border of the polygon. It may then select the polygon that contains the cell that, among all of the polygons, has the largest number of potential rectangles between that cell and the border of its polygon.

In some embodiments, the first frequency range and the second frequency range each have corresponding upper and lower limits, and selecting the second frequency range comprises selecting the second frequency range to be a range having: (a) an upper limit that is at least one half of the upper limit of the first frequency range; and (b) a lower limit that is at least one half of the lower limit of the first frequency range.

In some embodiments, the system may consider periods instead of frequencies. If so, then the second period range will have: (a) an upper limit that is at least twice the upper limit of the first period range; and (b) a lower limit that is at least twice the lower limit of the first period range.

BRIEF DESCRIPTION OF THE DRAWINGS

FIG. 4A illustrates an example of a sheet of test patterns, while

FIG. 5 illustrates an example document that includes multiple pantograph marks of various foreground and background pattern frequencies.

DETAILED DESCRIPTION

Figure 1:
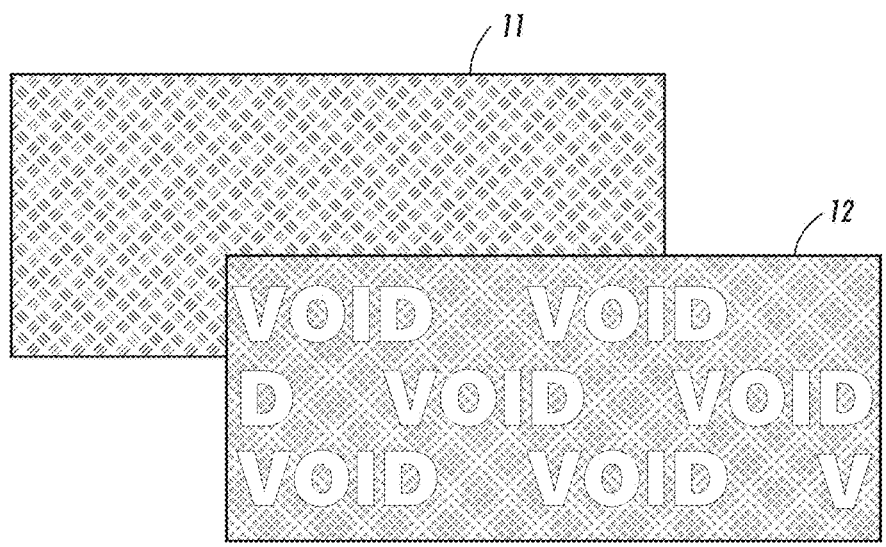
FIG. 1 illustrates an example of a document containing a void pantograph mark, along with a copy of such a document, such as may appear in the prior art.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

In this disclosure, the term "document" refers to any substrate onto which content is or has been printed. The content may be printed on the substrate using toner and/or ink. The document may, for example, include one or more areas comprising characters, and/or one or more other areas comprising images.

The terms "computing device" and "electronic device" interchangeably refer to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera for capturing images. An electronic device also may include one or more communication hardware components such as a transmitter and/or receiver that will enable the device to send and/or receive signals to and/or from other devices, whether via a communications network or via near-field or short-range communication protocols. If so, the programming instructions may be stored on the remote device and executed on the processor of the computing device as in a thin client or Internet of Things (IoT) arrangement. Example components of an electronic device are discussed below in the context of FIG. 6.

The terms "memory," "memory device," "computer-readable medium" and "data store" each refer to a non-transitory device on which computer-readable data, programming instructions or both are stored. Unless the context specifically states that a single device is required or that multiple devices are required, the terms "memory," "memory device," "computer-readable medium" and "data store" include both the singular and plural embodiments, as well as portions of such devices such as memory sectors.

A "print device" or "print engine" is a device that is configured to print a document based on digital data, or a multi-functional device in which one of the functions is printing based on digital data. Example components of a print device include a print head, which may include components such as a print cartridge or reservoir containing ink, toner or another print material, as well as a document feeding system configured to pass a substrate through the print device so that the print head can print characters and/or images on the substrate.

A "processor" or "processing device" is a hardware component of an electronic device that is configured to execute programming instructions. The term "processor" may refer to a single processor or to multiple processors that together implement various steps of a process. Unless the context specifically states that a single processor is required or that multiple processors are required, the term "processor" includes both the singular and plural embodiments.

A pantograph mark is a security mark having a foreground made of a pattern with a first frequency and a background with a pattern of a second frequency. The difference between the patterns is not visually perceivable in the original printed document. But when a copy of the original printed document is made, the difference will be visually perceivable. This patent application will describe a method of selecting target frequencies for each of the first and second patterns to allow for a relatively high level of frequency drift while still allowing the mark to remain hidden in an original document but revealed in a printed document.

Pantograph marks are typically created using patterns of dots that are of substantially fine (i.e., of small size), and which may be interspersed with other material printed on the substrate such that the overall pattern of the mark is not readily discernable to the human eye. Commonly, a pantograph mark includes a pattern of dots of at least two sizes. Each of the two sizes of dots in a pantograph mark may have the same tone, or they may have similar but not identical tones. By varying the size and/or tone of the two classes of dots, one class may be used as a background and the other class may be used to present a foreground message in the mark.

Figure 2:
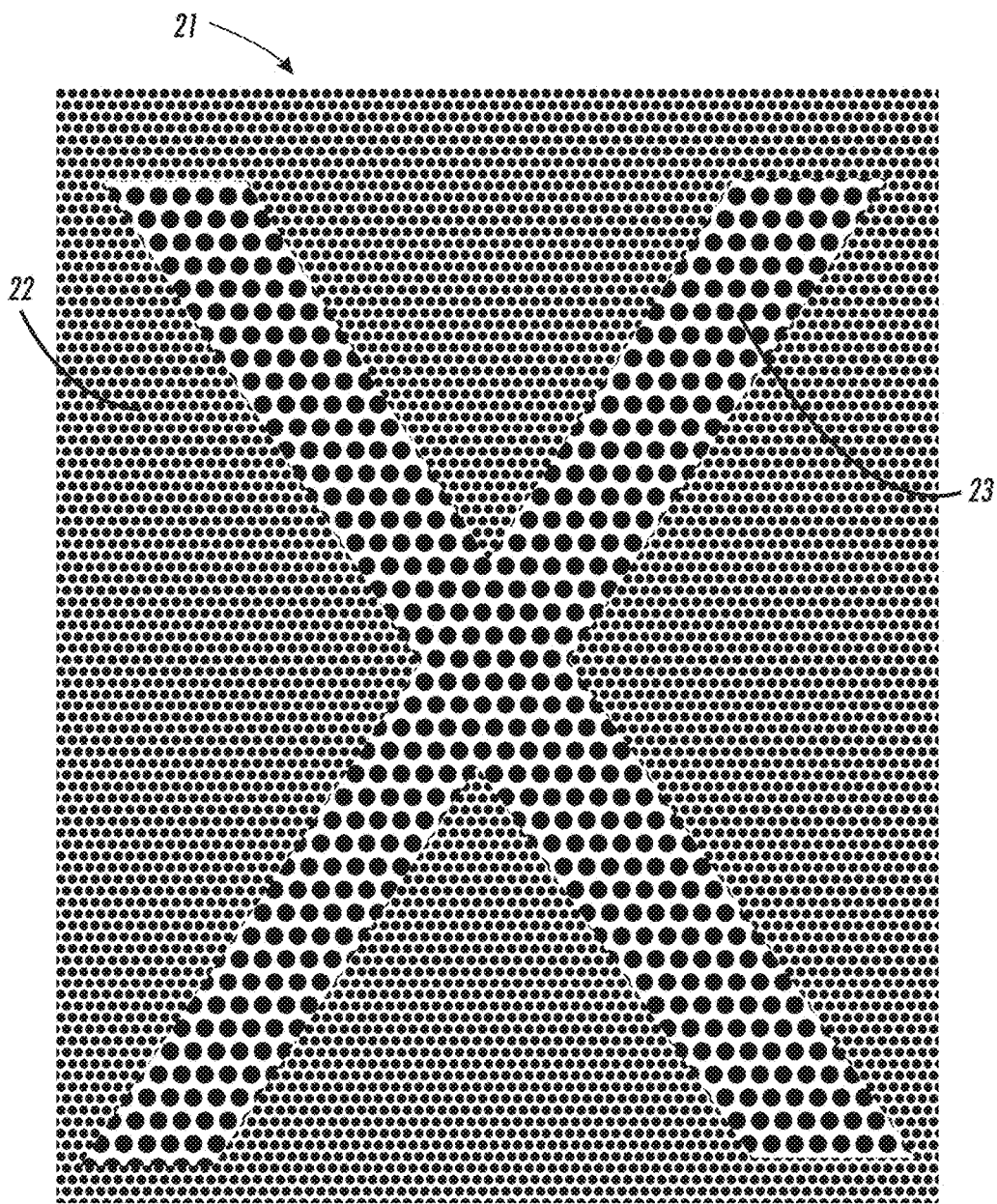
FIG. 2 illustrates an example of a pantograph mark such as is known in the prior art.

An example of this is shown in FIG. 2, in which a pantograph mark 21 includes a background 22 of relatively smaller dots and a foreground 23 of relatively larger dots. The foreground 23 is in the shape of the letter "X". The "frequency" of each pattern is a measure of the density of dots in the pattern. For example, the frequency may be the inverse of the distance between a dot and its nearest neighbor, or a function of such a measurement.

The dots of the background of a pantograph mark will typically have a frequency that is different from the dots of the foreground. For example, for a 600 dots per inch (dpi) print device, an example pantograph mark may be created with background pixel dots having a size of 2×2 pixels and a density of 10% (i.e., 10% coverage with ink on a white background), while the foreground pixel dots may have a size of 2×2 pixels and a density of 5%. Other pixels sizes and densities are possible, and in some pantograph marks the density of the foreground may be greater than that of the background. Also, it is not necessary that the foreground dots be larger than the background dots; in some marks background dots may be larger than the foreground dots.

In the prior art, to identify a pantograph mark pattern that is suitable for a particular print device and/or image to be printed, various test sheets would be printed. Each test sheet would include a test pattern such as the pantograph mark 21 shown in FIG. 2. The dot sizes and/or frequencies will be varied among the test sheets. The dot size and frequency values of the test pattern that is subjectively determined to be best will be selected and used when the print device (or a similar print device) is used to print pantograph marks on original documents in the future.

Figure 3:
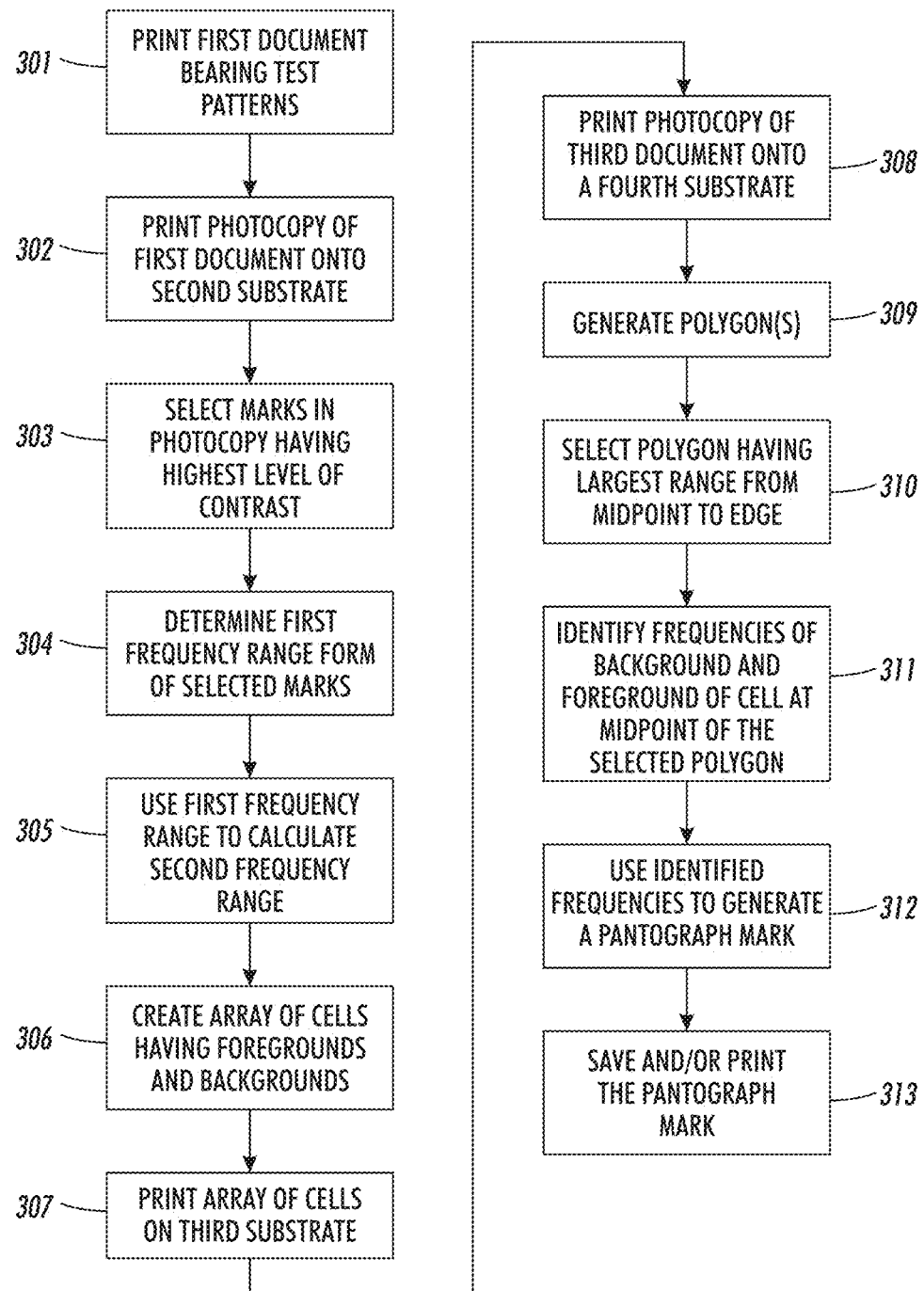
FIG. 3 illustrates a process of determining parameters for printing a pantograph mark.

FIG. 3 is a flow diagram illustrating various aspects of an improved method of determining parameters that a system will use to print a pantograph mark. The method, which may be implemented by one or more print devices that contain or are in communication with a processor that is implementing programming instructions, includes a print device printing a first document on a first substrate (step 301). The first document will include multiple test pattern marks. Each test pattern mark will be a mark having a single dot pattern size or frequency. Thus, each test pattern mark could correspond to either a foreground or a background of a pantograph mark.

Figure 4A:
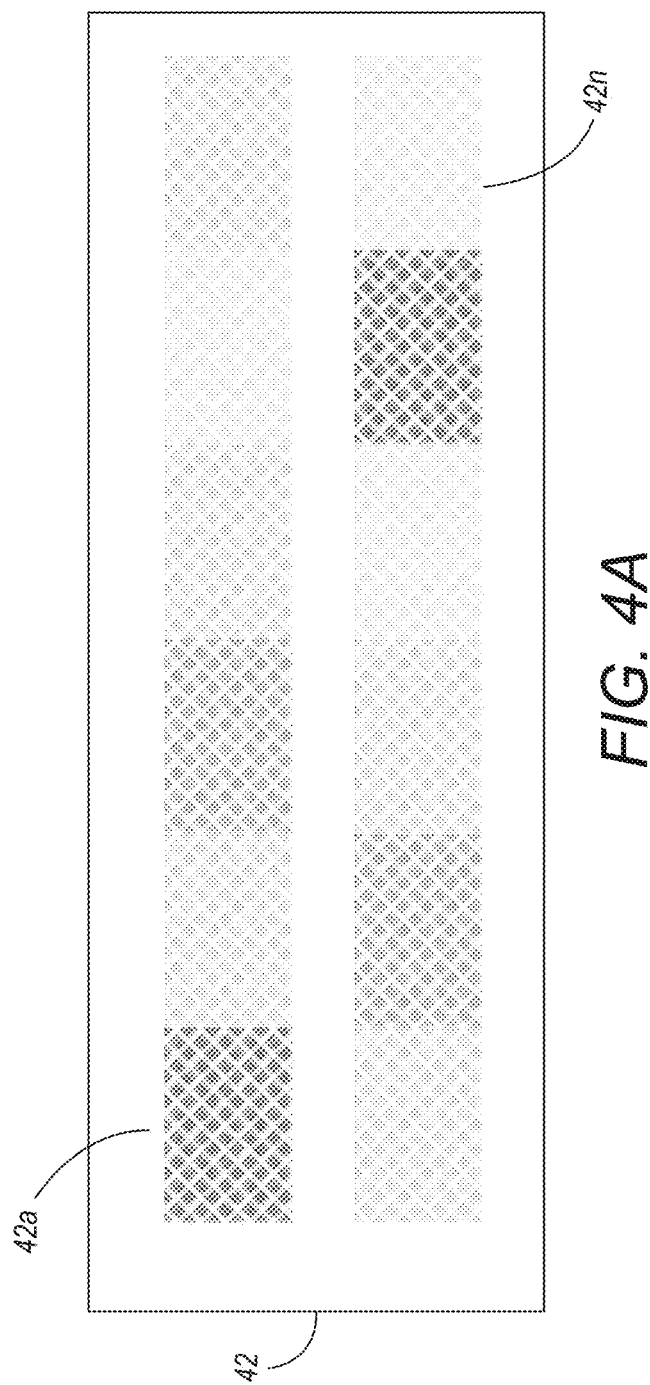

Each of the test pattern marks will exhibit a pattern having a frequency, and the frequencies will vary among the plurality of test pattern marks. An example of this is shown in FIG. 4A, in which the document 41 includes various test pattern marks 42a . . . . 42n of varying frequencies. Returning to FIG. 3, the same print device, or a different print device, will capture or receive an image of the printed document and print a copy of the document onto a second substrate (step 302). The copy may be created through a photocopying method, a scanning and printing method, by otherwise capturing a digital image of the document and printing the image on to the substrate, or by another copying process that attempts to create a duplicate of the scanned image, but where the amount by which the copy is an exact duplicate of the original may vary due to the physically-possible resolution of scanning and printing hardware, image capturing resolution, or other hardware or software factors.

Figure 4B:
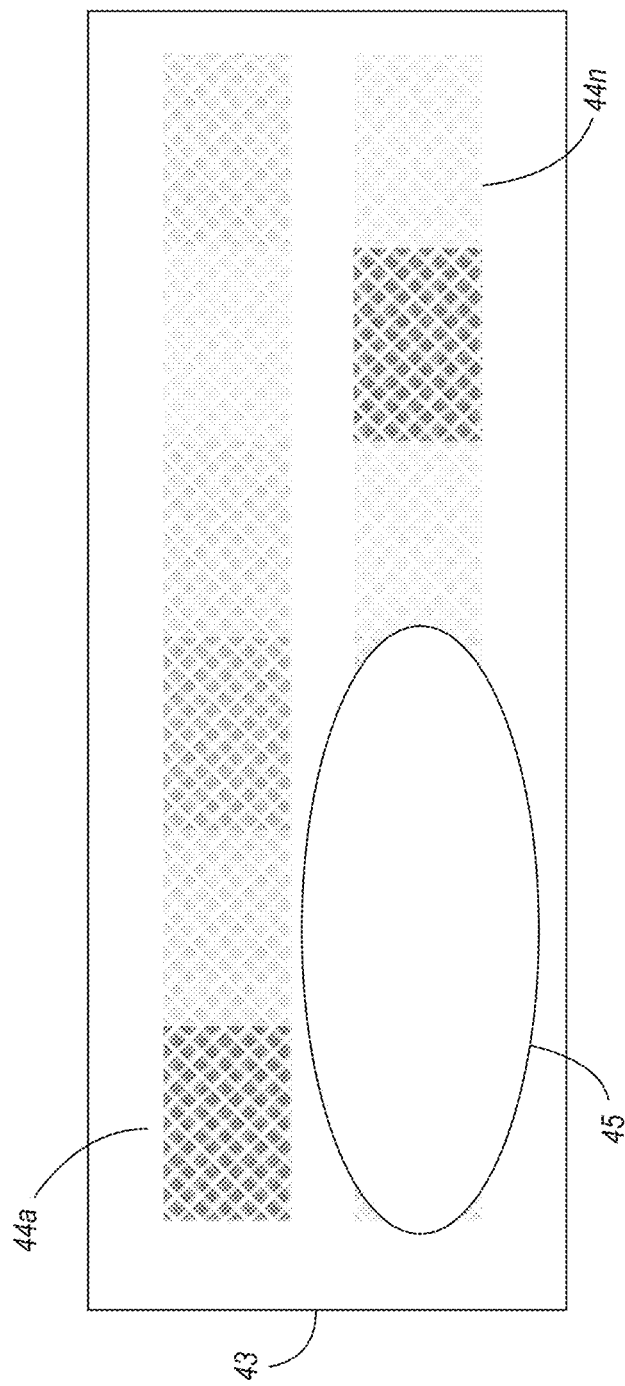
FIG. 4B illustrates how a copy of the sheet of FIG. 4A may contain variations due to print device resolution, ink or toner variations, environmental conditions or other factors.

An example of such a copy 43 is shown in FIG. 4B, in which the copy 43 includes the test pattern marks 44a . . . . 44n. The test pattern marks 44a . . . 44n of the copy 43 may vary slightly from the test pattern marks 42a . . . 42n in the original document 41 in terms of visibility due to scanning device resolution, print device resolution, ambient temperature when printing, humidity when printing, ink/toner used and/or other factors.

The system will analyze the test pattern marks that were copied onto the second substrate to determine a first frequency range of interest (step 304). The first frequency range of interest will be a frequency range in which a printed pattern of the copy will have a highest level of contrast as compared to the corresponding pattern printed in the original (i.e., on the first substrate). Selection of the test pattern marks having a highest level of contrast (step 303) in the copy may happen by receiving a manual input via a user interface of a selected set of test pattern marks that appear to be substantially faded as compared to the corresponding marks of the original, or that appear to be substantially darker than the corresponding marks of the original. An example of such an area is labeled as 45 in FIG. 4B, which includes three consecutive test pattern marks. Alternatively, selection of the marks having the highest level of contrast may happen by capturing an image of the copy and using a suitable image processing algorithm. An example is using an edge detection algorithm, to identify adjacent test pattern marks in the copy for which the boundary (edge) between the mark and the substrate, as well as the boundary between the mark and at least one adjacent mark, has become more prominent as compared to the original. Other methods of determining contrast may be used.

The frequency range of interest will be the range of frequencies contained in the test pattern marks that are selected as having the highest level of contrast. For example, in the test pattern marks of area 45, the frequencies may vary from values of X to Y, with X and Y being any value Note that the system also may consider the period, as inverse of the frequency, in this method. When this document uses the term frequency, it is intended to include embodiments that measure and use the period, density, and other such measurements instead of the frequency, as such embodiments would be functionally equivalent.

The system will then use the first frequency range to calculate a second frequency range (step 305) that is at least one half of the first frequency range. The upper limit of the second frequency range will be at least one half of the upper limit of the first frequency range, and the lower limit of the second frequency range will be at least one half of the lower limit of the first frequency rage. For example, if the first frequency range is 16% to 24%, the second frequency range will be at least 8% to 12%. (Note: if period is used as a proxy for frequency, then the second period range would be no more than twice the first period range.)

The system will then generate an array of cells (step 306) in which each of the cells includes: (a) a foreground pattern of dots that exhibit a frequency that is within either the first frequency range or the second frequency range; and (b) a background pattern of dots that exhibits the other of the first frequency range or the second frequency range. In other words, if the foreground pattern frequency is within the first frequency range, the background pattern frequency will be within the second frequency range, and vice versa. The cells will contain various foreground/background frequency combinations that are within these ranges. A print device will then print the array of cells on to a third substrate as a third document (step 307).

Figure 5:
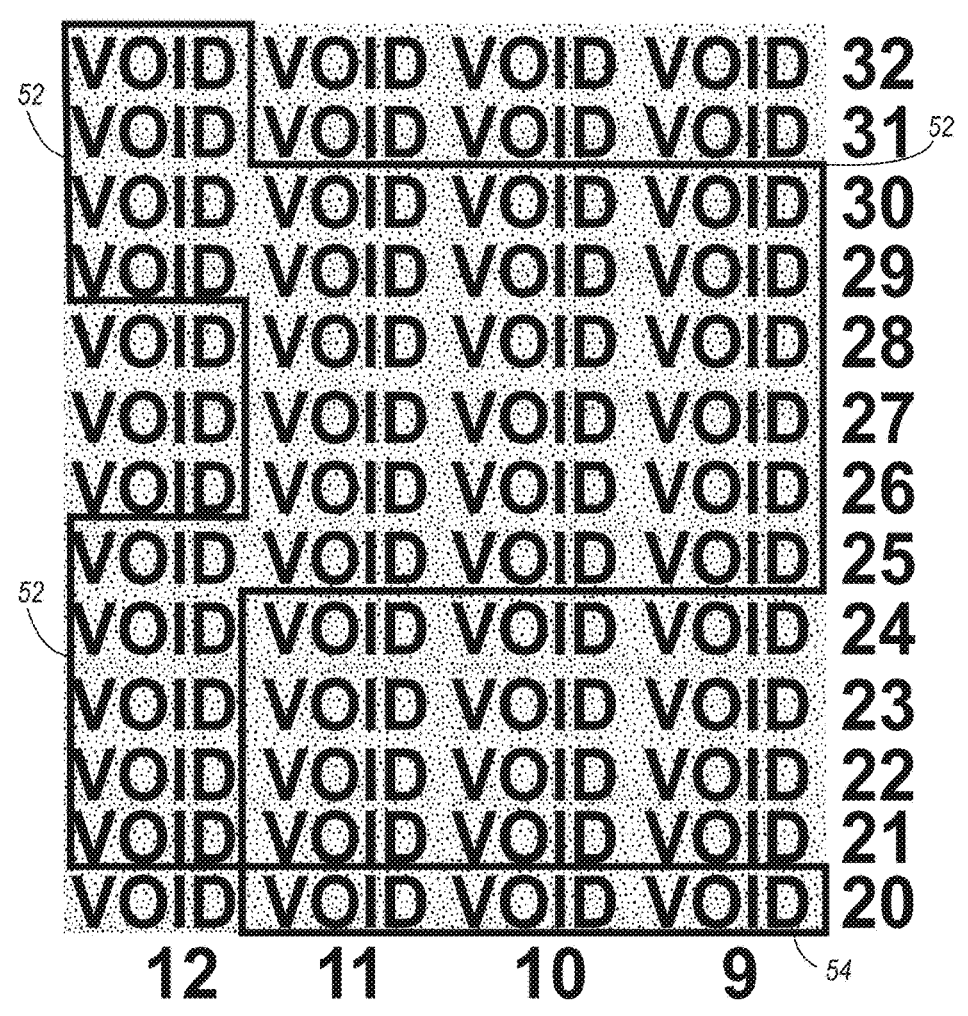

The same print device, or a different print device, will capture or receive an image of the printed third document and print a copy of the third document onto a fourth substrate (step 308). An example of such a copy 51 is shown in FIG. 5, in which the copy 51 includes the array of cells, each of which shows the foreground of the cell's pantograph mark (i.e., the word "void"). In FIG. 5, the x-axis and y-axis are marked with values of the periods of each cell's foreground and background frequencies. In FIG. 5, the x-axis represents the foreground period and the y-axis represents the background period. In FIG. 5, since period is inverse of frequency, the cell in the bottom left corner of the document has the highest foreground and background frequencies, while the cell in the upper left corner of the document has the lowest foreground and background frequencies. Note that in practice either axis may include either the foreground or background frequencies (or equivalents such as period) so long as one axis corresponds to foreground and the other axis corresponds to background.

Returning to FIG. 3, the system will generate one or more polygons (step 309), each of which is formed by (i.e., corresponds to) a border of an area that surrounds a group of adjacent cells of the fourth document in which the foreground is able to be visually distinguished from the background. As with the process of determining test pattern marks having a lowest level of visibility, the system may generate polygons by receiving manual selection of cells that should be included in a polygon, or by performing image processing using any edge detection or other suitable image analysis process. Example polygons 52 and 53 are shown in FIG. 5.

The system will then analyze the polygons and selecting the polygon having an inner point that has a largest range from midpoint to edge (step 310). To do this, the system may identify a cell having the largest number of potential rectangles between the cell and the border of the polygon. For example, referring to FIG. 5, in polygon 52 the inner point may be considered cell (10, 29) it has a total of nine rectangles from midpoint to edge: three rectangles to the left of the cell on the x-axis, one rectangle to the right of the cell on the x-axis, one rectangle up on the y-axis, and four rectangles down on the y-axis. No other cell within polygon 52 or 53 has as many potential rectangles between it and the edge. So, the system will select polygon 52 in this step.

Once the system selects the polygon having the inner point with a largest range from midpoint to edge, it will identify the frequency of the background pattern and the frequency of the foreground pattern of the cell in which the midpoint appears (step 311), and it will then generate a pantograph mark having the identified frequency (step 312).

The system may save instructions for the pantograph mark to a data file for document printing and/or print the pantograph mark onto a fifth substrate (step 313).

The methods described above may be implemented by a processing device and communicatively connected or integral print device. A memory may include programming instructions that, when executed by the processor, cause the print device to print documents and scan documents, and which cause the processor to analyze scanned data, to implement the processes described above.

Figure 6:
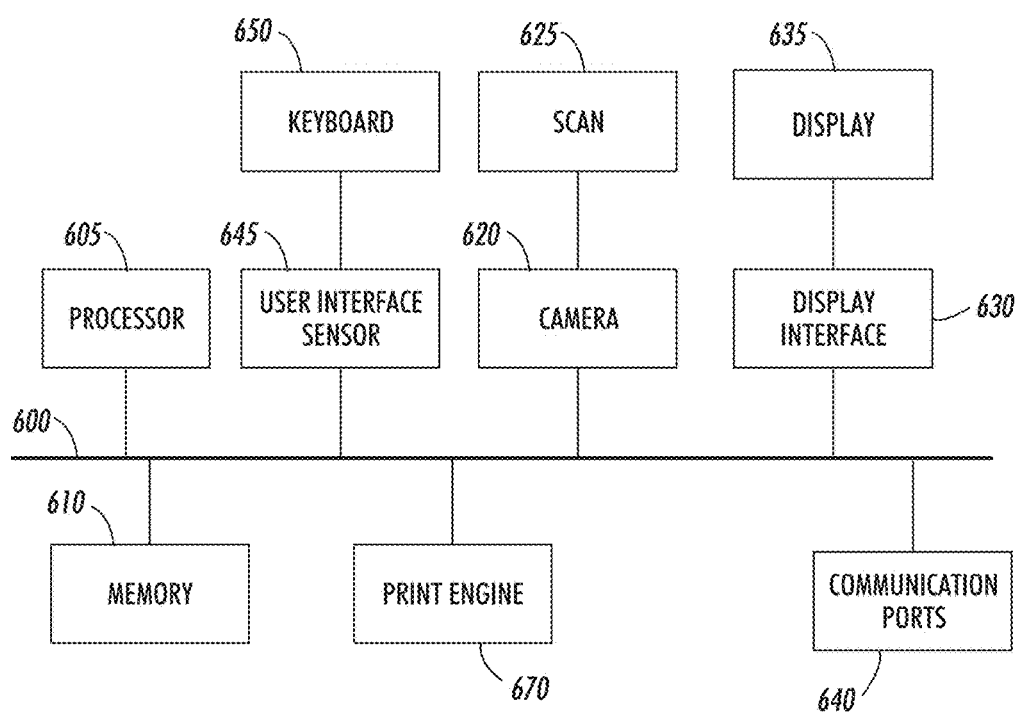
FIG. 6 is a block diagram showing various equipment that may be used to implement various embodiments of the processes described in this document.

FIG. 6 depicts an example of internal hardware that may be included in any of the electronic components of the system, such as a print device having a processing capability, or a local or remote computing device that is in communication with the print device, or a barcode scanning device. In FIG. 6, an electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 610 that may store the programming instructions. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 640 such as a wireless antenna, an RFID tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard, a mouse, a joystick, a touchscreen, a touch pad, a remote control, a pointing device and/or microphone. In embodiments where the electronic device is the smartphone or another image capturing device, digital images of a document or other image content may be acquired via a camera 620 that can capture video and/or still images. In embodiments where the electronic device includes a print device, the print device may include a print engine 670 with components such as a print head, document feeding system and other components typically used in print devices.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of generating a document bearing a security mark, the method comprising:
   by a print device, printing a first document that comprises a plurality of test pattern marks on a first substrate, wherein each of the test pattern marks exhibits a pattern having a frequency, and the frequencies vary among the plurality of test pattern marks;
   printing a second document onto a second substrate, wherein the second document is a copy of the first document;
   analyzing test pattern marks that appear on the second substrate to determine a first frequency range;
   selecting a second frequency range that is at least one half of the first frequency range;
   generating an array of cells in which each of the cells comprises:
      a foreground that exhibits a frequency that is within either the first frequency range or the second frequency range, and
      a background that exhibits a frequency that is within the other of the first frequency range or the second frequency range,
      wherein the array comprises cells that exhibit a plurality of combinations of frequencies of the first frequency range and the second frequency range;
   by a print device, printing a third document onto a third substrate, wherein the third document comprises the array of cells;
   printing a fourth document onto a fourth substrate, wherein the fourth document comprises a copy of the third document;
   generating one or more polygons, each of which comprises a border of an area that surrounds a plurality of adjacent cells in which the foreground is able to be visually distinguished from the background;

selecting, from the one or more polygons, the polygon having an inner point having a largest range from the inner to an edge of the polygon;

identifying the frequency of the background pattern and the frequency of the foreground pattern of the cell in which the inner point appears; and generating a pantograph mark having a background and foreground that correspond to the identified frequencies.

2. The method of claim 1 further comprising, by a print device, printing the pantograph mark onto a fifth substrate.

3. The method of claim 1, wherein analyzing the test pattern marks to determine the frequency range of interest comprises identifying one or more of the test pattern marks printed on the second substrate that exhibit a highest level of contrast with respect to corresponding test pattern marks printed on the first substrate.

4. The method of claim 3, wherein identifying one or more of the test pattern marks printed on the second substrate that exhibit the highest level of contrast with respect to corresponding test pattern marks printed on the first substrate comprises processing an image of the first substrate and an image of the second substrate to identify the one or more test pattern marks that exhibit the highest level of contrast.

5. The method of claim 1, wherein:
the first frequency range and the second frequency range each have corresponding upper and lower limits; and
selecting the second frequency range comprises selecting the second frequency range to be a range having:
an upper limit that is at least one half of the upper limit of the first frequency range, and
a lower limit that is at least one half of the lower limit of the first frequency range.

6. The method of claim 1, wherein:
the array has an x-axis and a y axis;
the x-axis comprises frequencies of one of the first frequency range or the second frequency range;
the y-axis comprises frequencies of the other of the first frequency range and the second frequency range.

7. The method of claim 1, wherein selecting, from the one or more polygons, the polygon having an inner point having a largest range from the inner point to edge comprises:
for each of the one or more polygons identifying a cell having the largest number of potential rectangles between that cell and a border of the polygon; and
selecting the polygon that contains the cell that, among all of the polygons, has the largest number of potential rectangles between that cell and the border of its polygon.

8. A method of generating a document bearing a security mark, the method comprising:
by a print device, printing a first document that comprises a plurality of test pattern marks on a first substrate, wherein each of the test pattern marks exhibits a pattern having a period, and the periods vary among the plurality of test pattern marks;
printing a second document onto a second substrate, wherein the second document is a copy of the first document;
analyzing test pattern marks that appear on the second substrate to determine a first period range;
selecting a second period range that is at least twice the first period range;
generating an array of cells in which each of the cells comprises:
a foreground that exhibits a period that is within either the first period range or the second period range, and
a background that exhibits a period that is within the other of the first period range or the second period range,
wherein the array comprises cells that exhibit a plurality of combinations of frequencies of the first period range and the second period range;
by a print device, printing a third document onto a third substrate, wherein the third document comprises the array of cells;
printing a fourth document onto a fourth substrate, wherein the fourth document comprises a copy of the third document;
generating one or more polygons, each of which comprises a border of an area that surrounds a plurality of adjacent cells in which the foreground is able to be visually distinguished from the background;
selecting, from the one or more polygons, the polygon having an inner point having a largest range from the inner point to an edge of the polygon;
identifying the period of the background pattern and the period of the foreground pattern of the cell in which the inner point appears; and
generating a pantograph mark having a background and foreground that correspond to the identified periods.

9. The method of claim 8, wherein analyzing the test pattern marks to determine the first period range comprises identifying one or more of the test pattern marks printed on the second substrate that exhibit a highest level of contrast with respect to corresponding test pattern marks printed on the first substrate.

10. The method of claim 9, wherein identifying one or more of the test pattern marks printed on the second substrate that exhibit the highest level of contrast with respect to corresponding test pattern marks printed on the first substrate comprises processing an image of the first substrate and an image of the second substrate to identify the one or more test pattern marks that exhibit the highest level of contrast.

11. The method of claim 8, wherein:
the first period range and the second period range each have corresponding upper and lower limits; and
selecting the second period range comprises selecting the second period range to be a range having:
an upper limit that is at least twice the upper limit of the first period range, and
a lower limit that is at least twice the lower limit of the first period range.

12. The method of claim 8, wherein selecting, from the one or more polygons, the polygon having an inner point having a largest range from the inner point to the edge comprises:
for each of the one or more polygons identifying a cell having the largest number of potential rectangles between that cell and a border of the polygon; and
selecting the polygon that contains the cell that, among all of the polygons, has the largest number of potential rectangles between that cell and the border of its polygon.

13. A secure document generation system comprising:
one or more print devices;
a processor; and
a memory containing programming instructions that are configured to cause the processor to:
cause one of the print devices to print a first document that comprises a plurality of test pattern marks on a first substrate, wherein each of the test pattern marks exhibits a pattern having a frequency, and the frequencies vary among the plurality of test pattern marks, cause one of the print devices to print a second document onto a second substrate, wherein the second document is a copy of the first document, analyze test pattern marks that appear on the second substrate to determine a first frequency range, select a second frequency range that is at least one half of the first frequency range, generate an array of cells in which each of the cells comprises:
- a foreground that exhibits a frequency that is within either the first frequency range or the second frequency range; and
- a background that exhibits a frequency that is within the other of the first frequency range or the second frequency range,
- wherein the array comprises cells that exhibit a plurality of combinations of frequencies of the first frequency range and the second frequency range, cause one of the print devices to print a third document onto a third substrate, wherein the third document comprises the array of cells, cause one of the print devices to print a fourth document onto a fourth substrate, wherein the fourth document comprises a copy of the third document, generate one or more polygons, each of which comprises a border of an area that surrounds a plurality of adjacent cells in which the foreground is able to be visually distinguished from the background, select, from the one or more polygons, the polygon having an inner point having a largest range from the inner point to edge of the polygon, identify the frequency of the background pattern and the frequency of the foreground pattern of the cell in which the inner point appears, and generate a pantograph mark having a background and foreground that correspond to the identified frequencies.

14. The system of claim 13, further comprising additional programming instructions that are configured to cause one of the print devices to print the pantograph mark onto a fifth substrate.

15. The system of claim 13, wherein the instructions to analyze the test pattern marks to determine the frequency range of interest comprise instructions to identify one or more of the test pattern marks printed on the second substrate that exhibit a highest level of contrast with respect to corresponding test pattern marks printed on the first substrate.

16. The system of claim 15, wherein the instructions to identify one or more of the test pattern marks printed on the second substrate that exhibit the highest level of contrast with respect to corresponding test pattern marks printed on the first substrate comprise instructions to process an image of the first substrate and an image of the second substrate to identify the one or more test pattern marks that exhibit the highest level of contrast.

17. The system of claim 13, wherein:
the first frequency range and the second frequency range each have corresponding upper and lower limits; and
the instructions to select the second frequency range comprise instructions to select the second frequency range to be a range having:
- an upper limit that is at least one half of the upper limit of the first frequency range, and
- a lower limit that is at least one half of the lower limit of the first frequency range.

18. The system of claim 13, wherein the instructions to select, from the one or more polygons, the polygon having an inner point having a largest range from the inner point to edge comprise instructions to:
for each of the one or more polygons identify a cell having the largest number of potential rectangles between that cell and a border of the polygon; and
select the polygon that contains the cell that, among all of the polygons, has the largest number of potential rectangles between that cell and the border of its polygon.

19. A secure document generation system comprising:
one or more print devices;
a processor; and
a memory containing programming instructions that are configured to cause the processor to:
cause one of the print devices to print a first document that comprises a plurality of test pattern marks on a first substrate, wherein each of the test pattern marks exhibits a pattern having a period, and the periods vary among the plurality of test pattern marks, cause one of the print devices to print a second document onto a second substrate, wherein the second document is a copy of the first document, analyze test pattern marks that appear on the second substrate to determine a first frequency range, select a second period range that is at least twice the first period range, generate an array of cells in which each of the cells comprises:
- a foreground that exhibits a period that is within either the first period range or the second period range; and
- a background that exhibits a period that is within the other of the first period range or the second period range,
- wherein the array comprises cells that exhibit a plurality of combinations of periods of the first period range and the second period range, cause one of the print devices to print a third document onto a third substrate, wherein the third document comprises the array of cells, cause one of the print devices to print a fourth document onto a fourth substrate, wherein the fourth document comprises a copy of the third document, generate one or more polygons, each of which comprises a border of an area that surrounds a plurality of adjacent cells in which the foreground is able to be visually distinguished from the background, select, from the one or more polygons, the polygon having an inner point having a largest range from the inner point to edge of the polygon, identify the frequency of the background pattern and the frequency of the foreground pattern of the cell in which the inner point appears, and generate a pantograph mark having a background and foreground that correspond to the identified frequencies.

20. The system of claim 19, wherein the instructions to analyze the test pattern marks to determine the period range of interest comprise instructions to identify one or more of the test pattern marks printed on the second substrate that exhibit a highest level of contrast with respect to corresponding test pattern marks printed on the first substrate.

* * * * *